US008738386B2

(12) United States Patent
Thesing

(10) Patent No.: US 8,738,386 B2
(45) Date of Patent: May 27, 2014

(54) EFFICIENT MULTICHANNEL SIGNAL PROCESSING BY SELECTIVE CHANNEL DECODING

(75) Inventor: Robin Thesing, Nuremberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 236 days.

(21) Appl. No.: 13/393,584

(22) PCT Filed: Oct. 5, 2010

(86) PCT No.: PCT/EP2010/006059
§ 371 (c)(1), (2), (4) Date: Mar. 1, 2012

(87) PCT Pub. No.: WO2011/042149
PCT Pub. Date: Apr. 14, 2011

(65) Prior Publication Data

US 2012/0209615 A1 Aug. 16, 2012

Related U.S. Application Data

(60) Provisional application No. 61/249,185, filed on Oct. 6, 2009.

(51) Int. Cl.
*G01L 19/00* (2006.01)
*G01L 21/00* (2006.01)

(52) U.S. Cl.
USPC .............................................. 704/500; 381/23

(58) Field of Classification Search
CPC ....................................................... G10L 19/008
USPC ..................................... 704/500; 381/23, 119
See application file for complete search history.

(56) References Cited

U.S. PATENT DOCUMENTS

| | | | | |
|---|---|---|---|---|
| 6,128,597 | A | 10/2000 | Kolluru | |
| 7,394,903 | B2 * | 7/2008 | Herre et al. | 381/23 |
| 7,536,299 | B2 | 5/2009 | Cheng | |
| 7,965,848 | B2 * | 6/2011 | Villemoes et al. | 381/22 |
| 2007/0011004 | A1 | 1/2007 | Tilman | |
| 2007/0233296 | A1 | 10/2007 | Junghoe | |
| 2008/0221907 | A1 | 9/2008 | Suk | |
| 2010/0083344 | A1 | 4/2010 | Schildbach | |
| 2011/0208528 | A1 | 8/2011 | Schildbach | |

FOREIGN PATENT DOCUMENTS

| | | |
|---|---|---|
| CN | 101490743 | 7/2009 |
| WO | 2005/101905 | 10/2005 |
| WO | 2011/015369 | 2/2011 |
| WO | 2011/073201 | 6/2011 |
| WO | 2011/100155 | 8/2011 |

OTHER PUBLICATIONS

ISO/IEC 14496-3 subpart 4 on Advanced Audio Coding.

ISO/IEC 13818-7:2006 Information Technology—Generic Coding of Moving Pictures and Associated Audio Information—Part 7: Advanced Audio Coding known as MPEG-2AAC.

* cited by examiner

*Primary Examiner* — Shaun Roberts

(57) ABSTRACT

An input signal conveying encoded information representing one or more audio channels is decoded by determining the configuration of channels represented by the encoded information, obtaining from the channel configuration a channel selection mask that specifies which of the one or more audio channels are to be decoded, extracting encoded information from the input signal, and decoding the extracted encoded information for those audio channels specified in the channel selection mask.

20 Claims, 4 Drawing Sheets

EFFICIENT MULTICHANNEL SIGNAL PROCESSING BY SELECTIVE CHANNEL DECODING

TECHNICAL FIELD

The present invention is generally related to audio and video coding systems, and pertains more specifically to improved ways to process and decode data representing audio and video information.

BACKGROUND ART

A number of international standards define how information representing aural and visual stimuli can be encoded and formatted for recording and transmission, and how the encoded information can be received and decoded for playback. For ease of discussion, information representing aural and visual stimuli is referred to herein as audio and video information, respectively.

Many applications that conform to these standards transmit the encoded audio and video information as binary data in a serial manner. As a result, the encoded data is often referred to as a bitstream but other arrangements of the data are permissible. For ease of discussion, the term "bitstream" is used herein to refer to encoded data regardless of the data format or the recording or transmission technique that is used.

Two examples of these standards that are published by the International Standards Organization (ISO) are ISO/IEC 13818-7, Advanced Audio Coding (AAC), also known as MPEG-2 AAC, and ISO/IEC 14496-3, subpart 4, also known as MPEG-4 audio. These two standards share technical features that make them similar to one another for purposes of this disclosure.

Standards such as the MPEG-2 AAC and MPEG-4 audio standards define bitstreams that are capable of conveying encoded data representing one or more audio channels. The concept of an audio channel is well known. The conventional stereophonic playback system with two loudspeakers is a well-known example of a playback system capable of reproducing two audio channels, often referred to as the left (L) and right (R) channels. Multichannel playback systems for so-called home theatre applications are capable of reproducing additional channels such as the center (C), back-left-surround (BL), back-right-surround (BR) and low-frequency-effects (LFE) channels.

A system that is capable of playing back audio from an encoded bitstream must include a device that is capable of extracting encoded data from the bitstream and decoding the extracted data into signals representing the individual audio channels. The cost of hardware resources for memory and processing required to decode data and apply a synthesis filter to obtain an output signal is a significant portion of the total manufacturing cost of the decoding device. As a result, the power requirements and purchase price of a decoder is affected significantly by the number of channels the decoder is capable of decoding. In an effort to reduce power requirements and purchase price, audio system manufacturers build decoders that are capable of decoding only a desired subset of all channels that are defined in a bitstream standard. Referring to the MPEG-2 AAC and MPEG-4 audio standards as examples, bitstreams can convey encoded data representing from one to forty-eight audio channels but most if not all practical decoders can decode only a small fraction of the maximum number of channels.

A typical decoder will process a particular bitstream only if it has the capability to decode all of the encoded channels that are conveyed in that bitstream. If a typical decoder receives a bitstream that conveys data representing more audio channels than it can decode, that decoder essentially discards the encoded data in the bitstream and does not decode any of the channels. This unfortunate situation exists because the decoder does not have the logic necessary to select and process a subset of the channels conveyed by the bitstream in an intelligent manner.

DISCLOSURE OF INVENTION

It is an object of the present invention to provide for a decoder that is capable of processing and decoding bitstreams that convey data representing a number of channels that exceed the number of channels the decoder is capable of decoding.

It is a further object of the present invention to provide this capability in a way that is efficient and minimizes the computational resources needed to process the bitstream.

These objects are achieved by the present invention. According to one aspect of the present invention, a decoder receives an input signal conveying encoded information representing one or more audio channels, determines a channel configuration map for the one or more audio channels that are represented by the encoded information, uses the channel configuration map to obtain a channel selection mask specifying which of the one or more audio channels are to be decoded, and extracts encoded information from the input signal and decodes the extracted encoded information according to the channel selection mask.

The various features of the present invention and its preferred embodiments may be better understood by referring to the following discussion and the accompanying drawings in which like reference numerals refer to like elements in the several figures. The contents of the following discussion and the drawings are set forth as examples. Alternative implementations and equivalent features included within the scope of the present invention should be readily apparent to those skilled in the relevant arts.

MODES FOR CARRYING OUT THE INVENTION

A. Introduction

Figure 1:
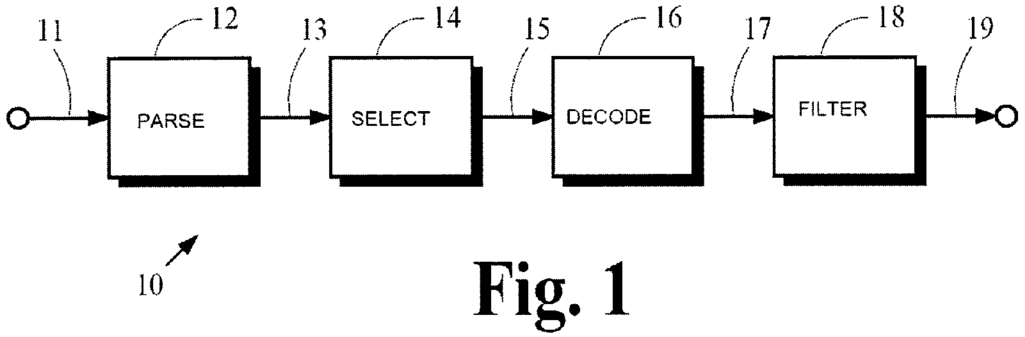
FIG. 1 is a schematic block diagram of an audio decoder.

FIG. 1 is a schematic block diagram of an audio decoder 10 that receives from the communication path 11 an input signal conveying a bitstream representing one or more channels of encoded audio information, and generates along the communication path 19 an output signal representing one or more channels of decoded audio information. The decoder 10 has a parse component 12 that extracts from the input signal bitstream a series of blocks or syntax elements of encoded data, which are then passed along the path 13 to the select component 14. The select component 14 determines which syntax elements of encoded data are passed along the path 15 to the decode component 16, which applies a decoding process to the blocks of encoded data to generate decoded data along the path 17. The filter component 18 applies one or more synthesis filters to the decoded data to generate decoded audio information along the path 19.

In a conventional implementation of the decoder 10, the select component 14 examines the contents of the syntax elements received from the path 13 to determine the number of input channels of encoded audio information that are conveyed in the input signal and compares this number with the number of audio channels the decoder 10 is capable of decoding. If the number of input channels that are conveyed in the input signal is less than or equal to the number of channels the decoder 10 is able to decode, then the select component 14 passes the syntax elements for all channels along the path 15 to the decode component 16; otherwise, the select component 14 does not pass any syntax elements to the decode component 16 or it provides some signal to the decode component 16 that indicates no channels are to be decoded.

The decode component 16 applies an appropriate decoding process to the data included in the syntax elements passed along the path 15. The decoding process should be complementary to the encoding process used to generate the encoded data conveyed in the syntax elements. If the input signal complies with the MPEG-2 AAC or MPEG-4 audio standards, for example, decode component 16 applies a process that conforms to the ISO/IEC 13818-7, or the ISO/IEC 14496-3, subpart 4, standards, respectively.

The decoded data derived from the data conveyed by the syntax elements is passed along the path 17 to the filter component 18, which applies a synthesis filter to the data in the decoded syntax elements that is the inverse of the analysis filter used by the encoder that encoded the data in the syntax elements. The synthesis filter may be implemented in a wide variety of ways including transforms like the Inverse Modified Discrete Cosine Transform or filters like the quadrature mirror filter (QMF).

B. Enhanced Channel Selection

A decoder that incorporates aspects of the present invention uses an enhanced select component 14 to determine a channel selection mask that defines the audio channels in an input bitstream that are to be selected and processed for playback. One implementation is described below that constructs the channel selection mask from a process that uses a set of one or more channel selection maps. These maps define configurations of number and type of output channels that can be decoded without imposing any limitation on the number of channels in the input bitstream. Alternative implementations are possible.

The channel selection process is efficient because it essentially discards data for those channels that are not selected for decoding at an early stage of the receiving/decoding process before computationally-intensive decoding algorithms are invoked. Stated differently, the computationally-intensive portions of the overall receiving/decoding process are applied only to those channels that are selected for decoding.

These aspects may be used with bitstreams that conform to all currently defined variations of the MPEG-2 AAC and MPEG-4 audio standards as well as other standards that have similar data constructs. The present invention can be employed in essentially any decoding device that needs to accept an input bitstream with an arbitrary number of channels and process that bitstream to obtain an optimum configuration of output channels obtained by decoding some or all of the channels in the bitstream.

1. Parse Component

The parse component 12 extracts a series of blocks or syntax elements of encoded data from the input signal bitstream. It may use conventional techniques well known in the art to extract these syntax elements.

The bitstreams that comply with many different standards including the MPEG-2 AAC and the MPEG-4 audio standards mentioned above are divided logically into segments referred to as frames. The data in an AAC-compliant bitstream, for example, defines a series of variable-length frames that are in turn divided logically into a series of blocks or syntax elements of different types. The first three bits in each syntax element specify the element type. There are eight different types of elements. A few of the types are described here.

A single-channel element (SCE) conveys data for a single audio channel. A channel-pair element (CPE) conveys data for a pair of audio channels. A program-configuration element (PCE) describes the channels of data conveyed by the bitstream. A low-frequency-effects element (referred to in this disclosure as LFEE) conveys data for the LFE channel or a special-effects channel. A termination element (TERM) indicates the last syntax element in a frame.

A particular AAC-compliant bitstream may not contain all types of syntax elements. For example, a bitstream that conveys data for only a single audio channel will not have any CPE, and a bitstream that does not convey data for a special-effects or LFE channel will not have any LFEE.

2. Select Component

Figure 2:
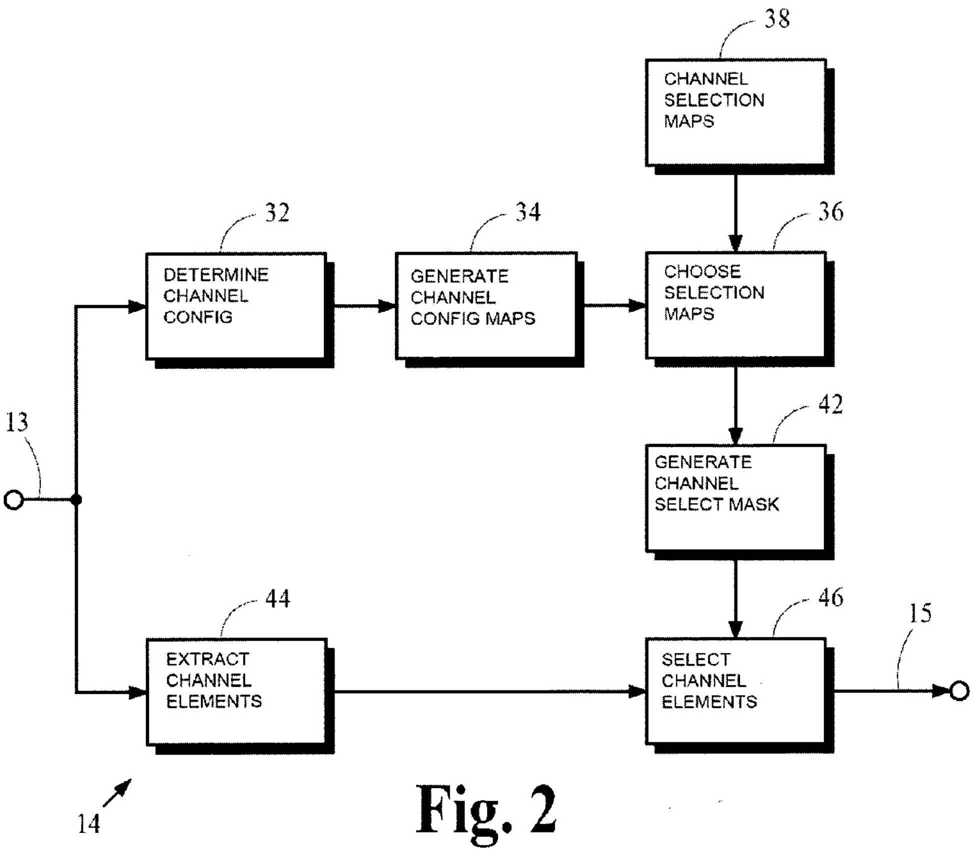
FIG. 2 is a schematic block diagram of a channel selection component for use in the audio decoder of FIG. 1.

FIG. 2 is a schematic illustration of one way the select component 14 may be implemented to carry out the present invention. In this implementation, component 32 determines the channel configuration of the bitstream. This is described in more detail below.

The component 34 uses this configuration to generate a channel configuration map. In one implementation, this map defines the relationship between each audio channel in the input bitstream and the loudspeaker position intended to reproduce that channel.

The component 38 provides a set of one or more channel selection maps that specify which loudspeaker positions can be decoded. In one implementation, the format and arrangement of the channel selection map is the same as the format and arrangement of the channel configuration map. This can facilitate processing performed by the component 36, which chooses the channel selection map providing the best match to the channel configuration of the input bitstream.

The component 42 uses the chosen channel selection map to construct a channel selection mask that defines which audio channels of the input bitstream are decoded and how they are steered to the output channels of the decoder 10.

These components are discussed in more detail below.

An alternative implementation is possible that constructs a channel selection mask for each of two or more channel selection maps and chooses the best selection mask for decoding. This implementation is not discussed further.

a) Extract Channel Configuration

The component 32 may determine the configuration of audio channels represented by a particular MPEG-2 AAC or MPEG-4 audio compliant bitstream in one of three ways. Two ways pertain to bitstreams that conform to either the MPEG-2

AAC or the MPEG-4 audio standards. The third way pertains only to bitstreams that conform to the MPEG-2 AAC standard.

An MPEG-2 AAC or an MPEG-4 audio compliant bitstream may signal the channel configuration using an index value, commonly called a channel configuration index, that indicates one of a number of pre-defined channel configurations listed in Table I. For MPEG-2 AAC compliant bitstreams, the index value comprises three bits and may indicate one of only the first 8 entries of Table I. For MPEG-4 audio compliant bitstreams, the index value is four bits and may indicate any one of the 16 entries of Table I. Each channel in the configuration is described in terms of the location a loudspeaker should be placed relative to a listener to reproduce that channel. An index value of zero in an MPEG-4 audio compliant bitstream indicates that the channel configuration is specified by a PCE. An index value of zero in an MPEG-2 AAC compliant bitstream indicates that either the channel configuration is specified by a PCE or it is specified implicitly. If a PCE is present in either type of bitstream, it will take precedence in the configuration process.

TABLE I

| Index | Channel Configuration |
|---|---|
| 0 | Configuration specified implicitly or by PCE |
| 1 | Single channel (C) |
| 2 | Two channels (L, R) |
| 3 | Three channels (C, L, R) |
| 4 | Four channels (C, L, R, BC) |
| 5 | Five channels (C, L, R, BL, BR) |
| 6 | Six channels (C, L, R, BL, BR, LFE) |
| 7 | Eight channels (C, L, R, SL, SR. BL, BR, LFE) |
| 8-15 | Reserved for future use |

The following channel notation is used:

(C) center front channel; (L) left front channel; (R) right front channel (BC) back center channel; (BL) back left channel; (BR) back right channel (SL) side left channel; (SR) side right channel; (LFE) low-frequency effects channel Additional channels referred to elsewhere that are between front and side channels are referred to as "wide" channels. The wide left channel (WL) is between the L and SL positions and the wide right channels are between the R and SR positions.

MPEG-2 AAC and MPEG-4 audio compliant bitstreams may also signal a channel configuration using a PCE, which carries configuration information dedicated to one audio program in the bitstream. To signal the channel configuration using this method, the channel configuration index must be set to zero. Additional details may be obtained from section 4.5.1.2 of the ISO/IEC 14496-3 standard. Those details are not needed to understand the present invention.

For MPEG-2 AAC compliant bitstreams, it is possible that neither of the previously described channel signaling methods may be used. In this case, the channel configuration index is set to zero but no PCE is present to define the configuration. An MPEG-2 compliant decoder must infer the channel configuration from the number and arrangement of audio channels specified by the audio-channel syntax elements using the rules defined in section 8.5.3.3. of ISO/IEC 13818-7. Details of those rules are not needed to understand the present invention.

b) Channel Configuration Map

The component 34 generates a channel configuration map that defines the relationship between the audio channels in the input bitstream and the positions of loudspeakers that are intended to reproduce the channels. The component 38 provides a set of one or more channel selection maps that specify which loudspeaker positions can be decoded. Preferably, the channel configuration map and the channel selection maps have the same format and arrangement of channels.

The items in the channel configuration maps are defined relative to the order of channels in a master channel selection map. The master channel selection map defines all possible channels that the decoder 10 can process and decode.

MPEG-2 AAC and MPEG-4 audio compliant bitstreams may convey as many as forty-eight channels. This number is much larger than the maximum number of channels a typical decoder can process. A typical maximum for a decoder is approximately ten channels or less. In preferred implementations, master channel selection maps do not include entries that define all forty-eight channels because the space in these maps would be generally unused. Smaller maps, on the order of ten entries, are usually sufficient. If a bitstream is encountered that conveys one or more channels not defined in the master channel selection map, each of those excess channels may be discarded.

A hypothetical master channel selection map which defines eleven channels is shown in Table II. In most implementations, not all of the channels in the master channel selection map can be decoded at the same time. For instance, a five-channel decoder cannot decode all eleven channels of the master selection map of Table II for a given bitstream, but it can decode various combinations of as many as five of those channels.

Table II also shows several exemplary channel configuration maps for different bitstream configurations. Each channel configuration map defines the relationship between the channels in a bitstream and the channels in the master channel selection map.

For MPEG-2 AAC and MPEG-4 audio compliant bitstreams, the decoder 10 may use the position of the channel in the bitstream as an index to the channel configuration map. The corresponding entry in the channel configuration map represents an index into the master channel selection map. The entry in the master channel selection map finally specifies the speaker position that is associated with the given channel in the bitstream.

TABLE II

| Channel Order In | | Channel Configuration Maps | | | | |
|---|---|---|---|---|---|---|
| Master Channel Selection Map | | Mono | Stereo | 5.0 | 5.1 | 7.1 |
| 0 - (C) | Center | 0 | 1 | 0 | 0 | 0 |
| 1 - (L) | Left | | 2 | 1 | 1 | 1 |
| 2 - (R) | Right | | | 2 | 2 | 2 |
| 3 - (WL) | Front Wide Left | | | 7 | 7 | 5 |
| 4 - (WR) | Front Wide Right | | | 8 | 8 | 6 |
| 5 - (SL) | Side Left | | | | 10 | 7 |
| 6 - (SR) | Side Right | | | | | 8 |
| 7 - (BL) | Back Left | | | | | 10 |
| 8 - (BR) | Back Right | | | | | |
| 9 - (BC) | Back Center | | | | | |
| 10 - (LFE) | Low Frequency Effects | | | | | |

Channel configuration maps for five different bitstream configurations are shown. The channel configuration map for a stereo bitstream is shown in the column under the "Stereo" heading. The two channels of the bitstream are mapped to the L and R channels. The channel configuration map for a so-called 5.0 bitstream is shown in the column under the "5.0" heading. The five channels of the bitstream are mapped to the C, L, R, BL and BR channels. The channel configuration map for a so-called 7.1 bitstream is shown in the column under the "7.1" heading. The eight channels of the bitstream are mapped to the C, L, R, SL, SR, BL, BR and LFE channels.

c) Channel Selection Maps

The channel selection maps provided by the component 38 define the combinations of channels in the master channel selection map that the decoder 10 can process and decode. One of these maps will be chosen by the component 36 to specify which channels in a bitstream are to be decoded.

Figure 3:
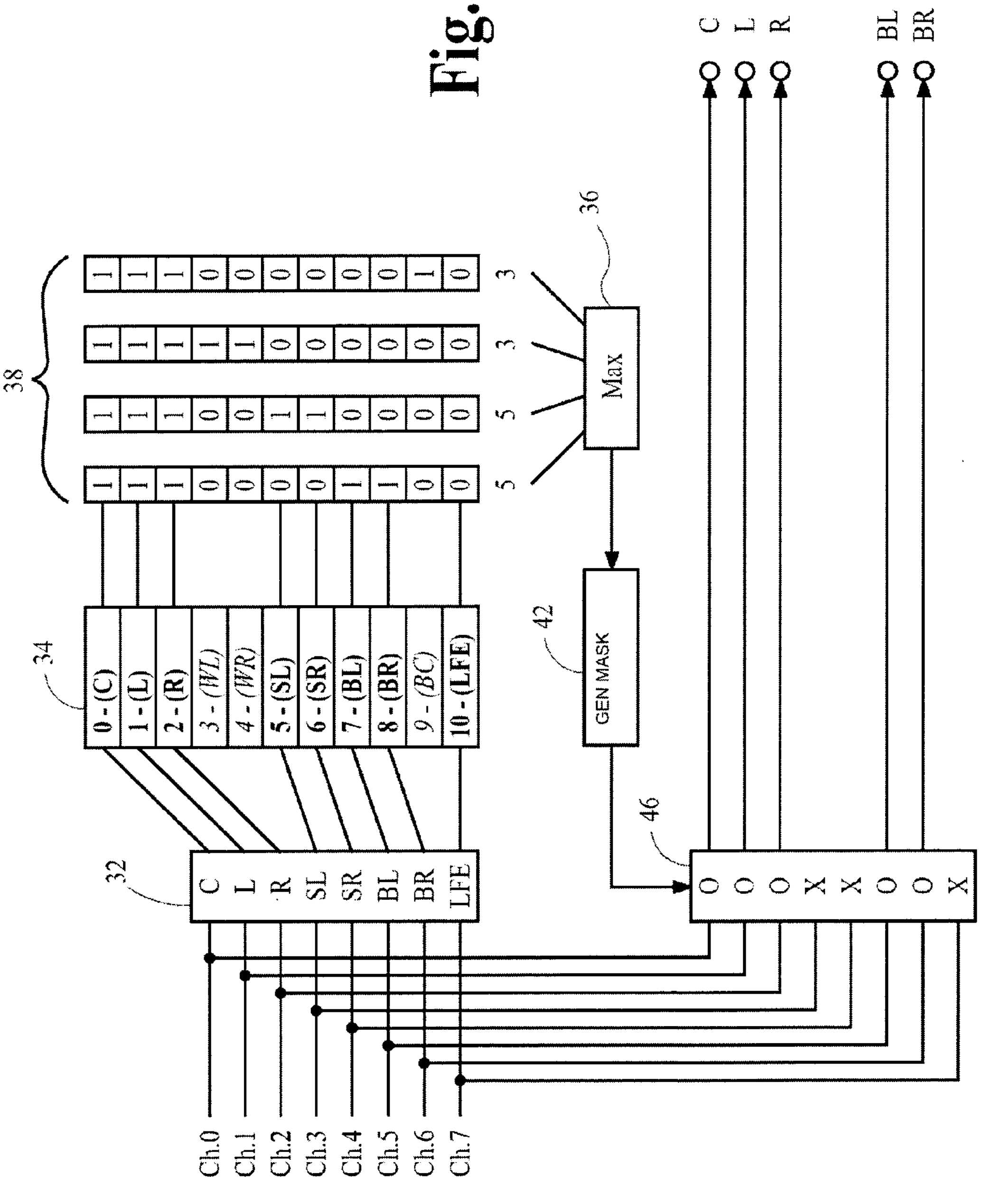
FIGS. 3 and 4 are schematic block diagrams that illustrate the operation of an exemplary implementation of a channel selection component.

Referring to FIG. 3, four channel selection maps provided by the component 38 are shown in the upper right-hand corner of the drawing. Each map has an item for each channel in the master channel selection map. An item represented by the symbol "1" indicates the corresponding channel can be processed and decoded. An item represented by the symbol "0" indicates the corresponding channel will not be decoded. The first three channel selection maps, in order from left to right, each have five "1" items. If one of these maps is chosen for processing, up to five channels can be decoded. The channel selection map that is farthest to the right has four "1" items. If this map is chosen for processing, up to four channels can be decoded.

d) Choose Channel Selection Map

The component 36 examines all of the channel selection maps provided by the component 38 and chooses the channel selection map that provides the best match to the channel configuration map generated by the component 34. In one implementation, the best match is determined by identifying the channel selection map that allows the greatest number of channels to be decoded. This is illustrated schematically in FIGS. 3 and 4.

Referring to FIG. 3, the component 34 generates a channel configuration map for an eight-channel bitstream that is consistent with the maps shown in the Table II. Channels in the configuration map that are present in the bitstream are shown in a bold typeface. Channels that are not present in the bitstream are shown in an italic typeface. In this exemplary implementation, the component 38 provides four channel selection maps as discussed above. The component 36 counts the number of "1" items in each channel selection map that corresponds to a channel in the channel configuration map and identifies the count. The count for each channel selection map, from left to right, is 5, 5, 3 and 3.

The component 36 chooses the channel selection map that can decode the largest number of channels. In this example, the largest number is five and two of the maps can decode five channels. In a preferred implementation, channel selection maps are assigned a priority and in case of a tie, the higher priority channel selection map is chosen. In this example, the channel selection maps are shown in priority order, from left to right. As a result, the first channel selection map is chosen for processing the bitstream.

Figure 4:
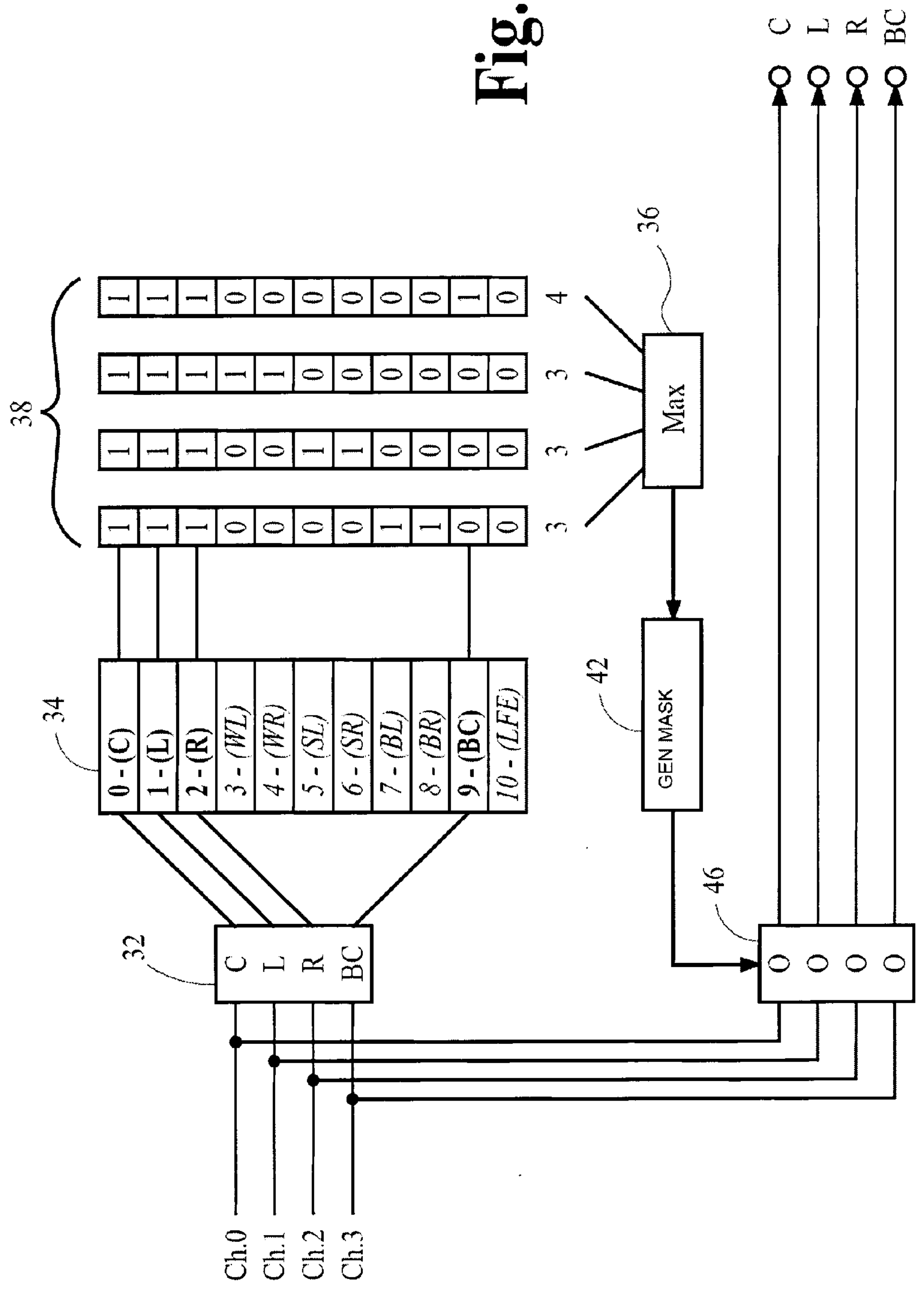

Another example is shown in FIG. 4. In this example, the component 34 generates a channel configuration map for a four-channel bitstream. Channels that are present and not present in the bitstream are shown with bold and italic typefaces, respectively. The component 38 provides the same four channel selection maps as discussed above. The component 36 counts the number of "1" items in each channel selection map that corresponds to a channel in the channel configuration map. The count for each channel selection map, from left to right, is 3, 3, 3 and 4. The component 36 chooses the channel selection mask that provides for decoding four channels.

e) Channel Selection Mask

The component 42 uses the chosen channel selection map to construct a channel selection mask that defines which audio channels of the input bitstream are decoded and how they are steered to the output channels of the decoder 10. The mask inhibits decoding of certain channels and permits decoding of other channels. In the implementation shown in FIGS. 3 and 4, the mask contains items represented by "O" and "X" symbols. An "O" item in the mask allows a channel to be decoded. An "X" item in the mask inhibits a channel from being decoded.

The channel selection mask has an item for each channel in the bitstream. If the item in the channel selection map is a "1" then the channel selection mask is constructed to have an "O" for the corresponding item. If the item in the channel selection map is a "0" then the channel selection mask is constructed to have an "X" for the corresponding item.

Referring to FIG. 3, the channel selection mask has eight items, one for each channel in the bitstream, and the five "O" items in the mask correspond to the five "1" items in the chosen channel selection map. Referring to FIG. 4, the channel selection mask has four items, one for each channel in the bitstream, and the four "O" items in the mask correspond to the four "1" items in the chosen channel selection map.

f) Extract and Select Channel Elements

The components 44 and 46 process the bitstream according to the channel selection mask. The component 44 extracts audio channel syntax elements from the bitstream and passes them to the component 46. The component 46 checks each audio channel syntax element against the channel selection mask. If the corresponding mask item is enabled, or is an "O" item as shown in the figures, that syntax element is passed along the path 15 for decoding. If the corresponding mask item is disabled, or is an "X" item as shown in the figures, the syntax item is discarded.

If data in the frames or in the syntax elements was encoded by a coding process such as Huffmann coding or arithmetic coding that produces variable-length symbols, the appropriate decoding must be applied to all of the encoded data so that the end of each syntax element and frame can be determined correctly. Data for channels selected for decoding are processed in a normal fashion. Data for channels that are inhibited from further decoding can be discarded or stored temporarily and overwritten as desired.

If any errors are detected in the encoded data that cannot be corrected, it may be desirable to mute the output of the decoder or take other action to conceal the errors. This may be necessary even if the error is detected in data corresponding to channels that are discarded because the errors may cause the decoder to lose synchronization with the frames. Conventional error recovery techniques may be used.

If the channel configuration map is determined implicitly, an entire frame of the bitstream must be examined before the channel configuration can be determined. As a result, the audio channel syntax elements in the first frame cannot be decoded as described above because they will have already been processed before the channel selection mask can be constructed This situation arises only for the first received frame of a bitstream. There is no need to determine the channel configuration map implicitly for any subsequent frame of the bitstream because, according to section 8.5.3.3 of the ISO/IEC 13818-7 standard, "an implicit reconfiguration is not allowed." If the channel configuration changes, this must be indicated by use of a PCE.

The audio channel syntax elements in the first received frame of a bitstream can be processed according to an implicitly determined channel configuration in a variety of methods as discussed below.

One method inhibits decoding audio from the first received frame. The channel selection mask is determined from the first received frame as described above and that mask is used for decoding the second and subsequent frames.

Another method buffers the syntax elements for each frame prior to processing. This approach requires additional memory, perhaps as much memory as a prior art decoder, but it provides a reduction in computational complexity substantially the same as that achieved by a decoder that constructs its channel configuration from explicit information in the bitstream as described above.

Yet another method processes audio channel syntax elements in the first frame using a "flat" channel selection mask. A flat channel selection mask enables decoding for the first N channels, where N is the maximum number of channels allowed by any of the channel selection maps provided by the component 38. This approach can guarantee only that, for the first received frame, the number of output channels is effectively limited to the maximum number that the decoder can decode. This approach cannot ensure that each decoded channel will correspond to a channel present in one of the channel selection maps provided by the component 38.

In general, attempts to associate a speaker position to an implicitly configured channel should be considered guesses because no information concerning the intended speaker position is explicitly conveyed in the bitstream. Nevertheless, these guesses produce good results in many cases because the procedure for distributing implicitly signaled channels outlined in ISO/IEC 13818-7 section 8.5.3.3 provides certain guidance.

C. Implementation

Figure 5:
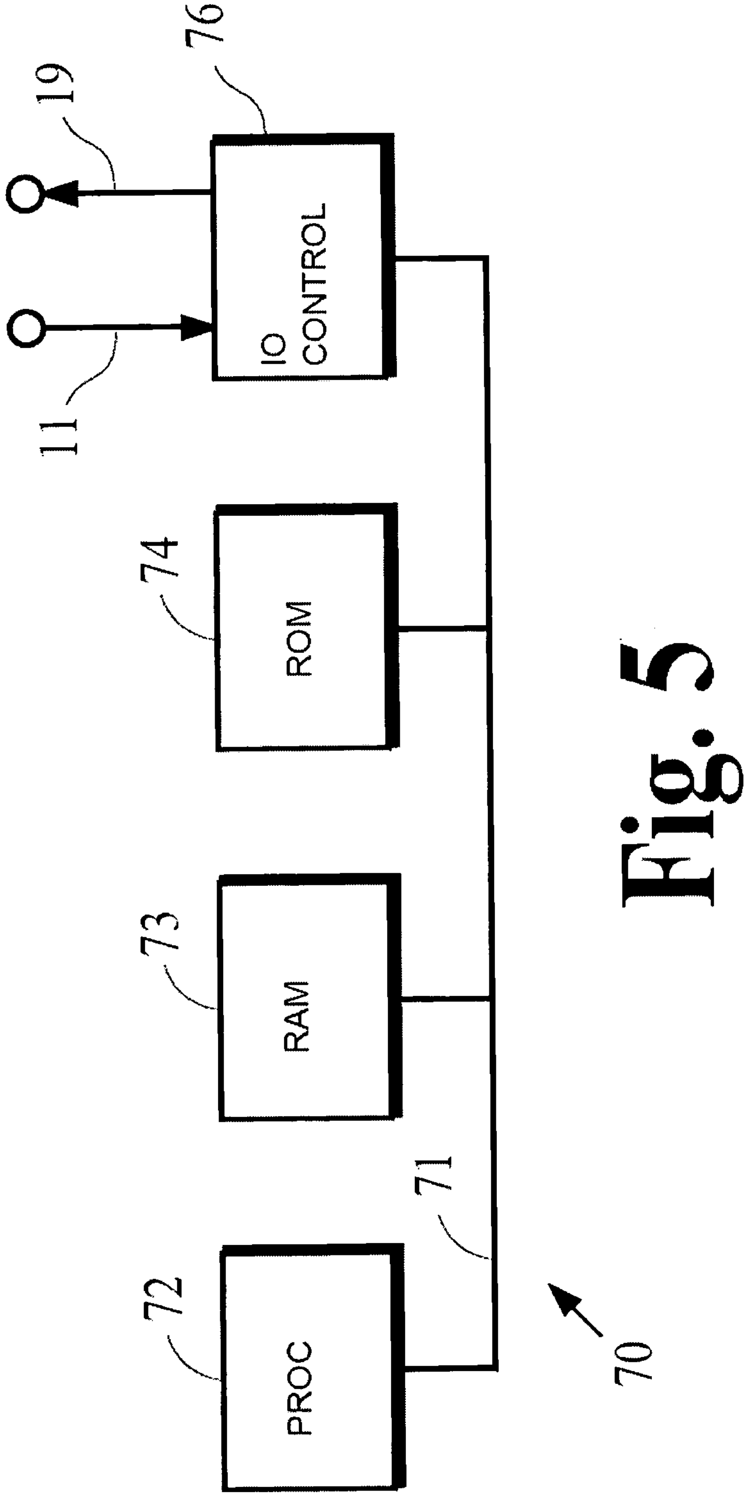
FIG. 5 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 5 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 76 represents interface circuitry to receive and transmit signals by way of the communication paths 11, 19. In the embodiment shown, all major system components connect to the bus 71, which may represent more than one physical or logical bus; however, a bus architecture is not required to implement the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method for decoding encoded audio information, wherein the method comprises:

receiving an input signal at a decoder conveying encoded information representing one or more audio channels;

providing a master channel selection map which defines all possible channels that the decoder can process and decode;

determining a channel configuration map for the one or more audio channels that are represented by the encoded information; wherein the channel configuration map defines a relationship between each audio channel in the input signal and a channel in the master channel selection map; wherein an entry in the master channel selection map specifies the speaker position that is associated with the corresponding channel in the input signal;

providing a plurality of channel selection maps which define combinations of channels in the master channel selection map that the decoder can process and decode;

choosing the channel selection map from the plurality of channel selection maps that provides a best match to the channel configuration map; and constructing a channel selection mask such that it specifies each channel in the channel configuration map that has a corresponding loudspeaker position in the chosen channel selection map;

extracting encoded information from the input signal; and decoding the extracted encoded information for those audio channels specified in the channel selection mask.

2. The method of claim 1 that comprises:

selecting the channel selection map from the plurality of channel selection maps having a largest number of loudspeaker positions that exist in the channel configuration map; and choosing the selected channel selection map as the channel selection map that provides a best match to the channel configuration map.

3. The method of claim 2, wherein:

each channel selection map from the plurality of channel selection maps has a respective priority;

two or more channel selection maps from the plurality of channel selection maps have a number of loudspeaker positions that exist in the channel configuration map that are equal to the largest number; and the method comprises selecting the channel selection map from the two or more channel selection maps that has the highest priority.

4. The method of claim 1, wherein the encoded audio information represents a first number of audio channels, the channel selection mask specifies a second number of audio channels to be decoded, and the first number is larger than the second number.

5. The method of claim 1 that determines the channel configuration map by examining data conveyed in the input signal.

6. The method of claim 5 that determines the channel configuration map from data in the input signal that specifies one channel configuration from a set of pre-defined channel configurations.

7. The method of claim 5 that determines the channel configuration map from data in the input signal that expressly specifies each audio channel represented in the input signal.

8. The method of claim 7 that determines the channel configuration map by determining number and arrangement of the audio channels represented in the input signal.

9. The method of claim 8, wherein:

the encoded audio information conveyed in the input signal is arranged in a plurality of frames;

the channel configuration map is determined by determining the number and arrangement of the audio channels from a first received frame; and the method comprises:

decoding extracted encoded information from the first received frame according to audio channels specified in a flat channel selection mask, wherein the flat channel selection mask specifies a maximum number of audio channels capable of being decoded; and decoding extracted encoded information from frames following the first received frame for those audio channels specified in the channel selection mask.

10. An apparatus for decoding encoded audio information, wherein the apparatus comprises means for receiving an input signal at a decoder conveying encoded information representing one or more audio channels;

means for providing a master channel selection map which defines all possible channels that the decoder can process and decode;

means for determining a channel configuration map for the one or more audio channels that are represented by the encoded information; wherein the channel configuration map defines a relationship between each audio channel in the input signal and a channel in the master channel selection map; wherein an entry in the master channel selection map specifies the speaker position that is associated with the corresponding channel in the input signal;

means for providing a plurality of channel selection maps which define combinations of channels in the master channel selection map that the decoder can process and decode;

means for choosing the channel selection map from the plurality of channel selection maps that provides a best match to the channel configuration map;

means for constructing a channel selection mask such that it specifies each channel in the channel configuration map that has a corresponding loudspeaker position in the chosen channel selection map;

means for extracting encoded information from the input signal; and means for decoding the extracted encoded information for those audio channels specified in the channel selection mask.

11. The apparatus of claim 10, wherein the apparatus comprises:

means for selecting the channel selection map from the plurality of channel selection maps having a largest number of loudspeaker positions that exist in the channel configuration map; and means for choosing the selected channel selection map as the channel selection map that provides a best match to the channel configuration map.

12. The apparatus of claim 11, wherein each channel selection map from the plurality of channel selection maps has a respective priority;

two or more channel selection maps from the plurality of channel selection maps have a number of loudspeaker positions that exist in the channel configuration map that are equal to the largest number; and the apparatus comprises means for selecting the channel selection map from the two or more channel selection maps that has the highest priority.

13. The apparatus of claim 10, wherein the encoded audio information represents a first number of audio channels, the channel selection mask specifies a second number of audio channels to be decoded, and the first number is larger than the second number.

14. The apparatus of claim 10, wherein the channel configuration map is determined by examining data conveyed in the input signal.

15. The apparatus of claim 14, wherein the channel configuration map is determined from data in the input signal that specifies one channel configuration from a set of pre-defined channel configurations.

16. The apparatus of claim 14, wherein the channel configuration map is determined from data in the input signal that expressly specifies each audio channel represented in the input signal.

17. The apparatus of claim 16, wherein the channel configuration map is determined by determining number and arrangement of the audio channels represented in the input signal.

18. The apparatus of claim 17, wherein:

the encoded audio information conveyed in the input signal is arranged in a plurality of frames;

the channel configuration map is determined by determining the number and arrangement of the audio channels from a first received frame; and the apparatus comprises:

means for decoding extracted encoded information from the first received frame according to audio channels specified in a flat channel selection mask, wherein the flat channel selection mask specifies a maximum number of audio channels capable of being decoded; and means for decoding extracted encoded information from frames following the first received frame for those audio channels specified in the channel selection mask.

19. A non-transitory storage medium recording a program of instructions that is executable by a device for receiving an input signal at a decoder conveying encoded information representing one or more audio channels;

providing a master channel selection map which defines all possible channels that the decoder can process and decode;

determining a channel configuration map for the one or more audio channels that are represented by the encoded information; wherein the channel configuration map defines a relationship between each audio channel in the input signal and a channel in the master channel selection map; wherein an entry in the master channel selection map specifies the speaker position that is associated with the corresponding channel in the input signal;

providing a plurality of channel selection maps which define combinations of channels in the master channel selection map that the decoder can process and decode;

choosing the channel selection map from the plurality of channel selection maps that provides a best match to the channel configuration map; and constructing a channel selection mask such that it specifies each channel in the channel configuration map that has a corresponding loudspeaker position in the chosen channel selection map;

extracting encoded information from the input signal; and decoding the extracted encoded information for those audio channels specified in the channel selection mask.

20. The non-transitory storage medium of claim 19, wherein the program of instructions is executable for:

selecting the channel selection map from the plurality of channel selection maps having a largest number of loudspeaker positions that exist in the channel configuration map; and choosing the selected channel selection map as the channel selection map that provides a best match to the channel configuration map.

* * * * *